(12) United States Patent
De Lemps et al.

(10) Patent No.: US 11,186,133 B2
(45) Date of Patent: Nov. 30, 2021

(54) SUSPENSION THRUST BEARING DEVICE AND SUSPENSION STRUT EQUIPPED WITH SUCH A DEVICE

(71) Applicants: SKF Korea Ltd., Seoul (KR); Aktiebolaget SKF, Gothenburg (SE)

(72) Inventors: Francois De Lemps, Saint-Cyr-sur-Loire (FR); Tommy Jullien, Ambillou (FR); Bruno Montboeuf, Saint-Cyr-sur-Loire (FR); Heedong Oh, Seoul (KR)

(73) Assignees: AKTIEBOLAGET SKF; SKF KOREA LTD., Seoul (KR)

( * ) Notice: Subject to any disclaimer, the term of this patent is extended or adjusted under 35 U.S.C. 154(b) by 210 days.

(21) Appl. No.: 16/708,839

(22) Filed: Dec. 10, 2019

(65) Prior Publication Data

US 2020/0189344 A1 Jun. 18, 2020

(30) Foreign Application Priority Data

Dec. 12, 2018 (KR) ........................ 10-2018-0160096

(51) Int. Cl.
*B60G 15/06* (2006.01)
*F16C 19/10* (2006.01)
*F16C 33/76* (2006.01)

(52) U.S. Cl.
CPC ............ *B60G 15/068* (2013.01); *F16C 19/10* (2013.01); *F16C 33/761* (2013.01); *B60G 2202/312* (2013.01); *B60G 2204/128* (2013.01); *B60G 2204/1242* (2013.01); *B60G 2204/418* (2013.01); *F16C 2326/05* (2013.01)

(58) Field of Classification Search
CPC ..................................................... B60G 15/08
See application file for complete search history.

(56) References Cited

U.S. PATENT DOCUMENTS 6,988,718 B1 * 1/2006 Eulenbach ........... B60G 15/063
188/321.11
7,077,248 B2 * 7/2006 Handke ................ B60G 15/068
188/321.11

(Continued)

FOREIGN PATENT DOCUMENTS

DE 102014208321 A1 * 11/2015 ................ F16F 9/54
DE 102017208997 A1 * 11/2018 ............ F16C 33/588

(Continued)

*Primary Examiner* — Nicole T Verley
(74) *Attorney, Agent, or Firm* — Reed Smith LLP

(57) ABSTRACT

This disclosure relates to a suspension thrust bearing device, for use with a suspension spring in an automotive suspension strut of a vehicle. The device comprises a bearing having upper and lower annular bearing members in relative rotation, and a damping element made of resilient material and interposed between the lower annular bearing member and the suspension spring. The damping element comprising at least one deflecting flange for reducing any ingress of water and other pollutants between the upper and lower annular bearing members. The damping element is provided with an annular groove open axially towards the suspension spring, said annular groove radially defining a spring support surface on inner side, and the said deflecting flange on outer side.

20 Claims, 3 Drawing Sheets

(56) References Cited

U.S. PATENT DOCUMENTS

| | | | | |
|---|---|---|---|---|
| 7,347,414 | B2* | 3/2008 | Groves | B60G 3/20 |
| | | | | 267/220 |
| 10,428,869 | B2* | 10/2019 | Gaultier | F16C 33/3887 |
| 2008/0031562 | A1 | 2/2008 | Poulle et al. | |
| 2015/0314662 | A1* | 11/2015 | Call | B23P 11/005 |
| | | | | 29/509 |
| 2016/0089946 | A1* | 3/2016 | Bedeau | B60G 15/068 |
| | | | | 248/634 |
| 2017/0158012 | A1* | 6/2017 | Hubert | F16C 19/163 |
| 2018/0372152 | A1* | 12/2018 | Gaultier | F16C 19/10 |
| 2019/0308479 | A1* | 10/2019 | Montboeuf | B60G 15/068 |
| 2020/0231015 | A1* | 7/2020 | Blanchard | B60G 15/04 |
| 2020/0238779 | A1* | 7/2020 | Blanchard | F16C 27/066 |
| 2021/0222733 | A1* | 7/2021 | Blanchard | F16C 19/12 |

FOREIGN PATENT DOCUMENTS

| | | | | |
|---|---|---|---|---|
| EP | 3002137 | A1 * | 4/2016 | F16C 33/761 |
| FR | 2970674 | A1 * | 7/2012 | F16C 33/761 |
| FR | 3099415 | A1 * | 2/2021 | F16C 19/10 |

* cited by examiner

SUSPENSION THRUST BEARING DEVICE AND SUSPENSION STRUT EQUIPPED WITH SUCH A DEVICE

PRIORITY CLAIM

This application claims the benefit of priority to Republic of Korea Patent Application No. 10-2018-0160096, filed Dec. 12, 2018, under 35 U.S.C. § 119, the contents of which are incorporated herein by reference in their entirety.

FIELD

The present disclosure relates to suspension systems, notably motor-vehicle suspension systems. In particular, this disclosure relates to a suspension thrust bearing device. This disclosure also relates to a strut for a motor vehicle, comprising a damper and such a suspension thrust bearing device.

BACKGROUND

A motor vehicle suspension system comprises a suspension strut supporting an axle and a vehicle wheel.

BRIEF DESCRIPTION OF THE DRAWINGS

Various preferred embodiments will now be explained in reference to the drawings, as illustrative examples, without restricting the scope of this disclosure.

DETAILED DESCRIPTION

A motor vehicle suspension strut may include a suspension thrust bearing device. A suspension thrust bearing device may be disposed in an upper portion of said suspension strut, opposite to the wheel and the ground, and between a suspension spring and an upper support block attached to the vehicle chassis.

The suspension thrust bearing device may include at least one bearing, for example a rolling bearing, comprising upper and lower annular bearing members in relative rotation around a main axis.

The suspension thrust bearing device, among other things, enables transmission of axial forces between a spring and a body of a vehicle and allows relative angular movement between the spring, which is mobile in rotation, and the fixed support block attached to a vehicle body.

A damping function of a suspension thrust bearing device can be improved by using a damping element made of resilient material and mounted between the lower cup and a suspension spring.

Such a suspension thrust bearing device, notably of the MSBU type, is required to be used in an aggressive environment. The vehicle is for example likely to run on a flooded, dusty or muddy road and then be cleaned with a high-pressure cater jet. In these conditions, ingress of water or of other polluting particles may occur in the strut, notably in the bearing, with harmful consequences to their service life and their respective performances.

In this respect, US 2008/0031562 provides a deflecting flange extending substantially radially from a damping element, said flange being designed to form a flow deflector for reducing any ingress of water and other pollutants inside the suspension thrust bearing device.

However, the axial load of suspension spring onto the damping element may induce axial and radial deformations of said element. More particularly, it has been observed that a deflecting flange upwardly moves towards an upper cup. This undesired flange displacement leads to contacts with an upper cup, and then an increase of suspension thrust bearing device torque and negative impact on device performances. The deflecting flange and upper cup may thereby be worn leading to a reduced service life. It also leads to undesirable noise which must be prohibited.

Figure 1:
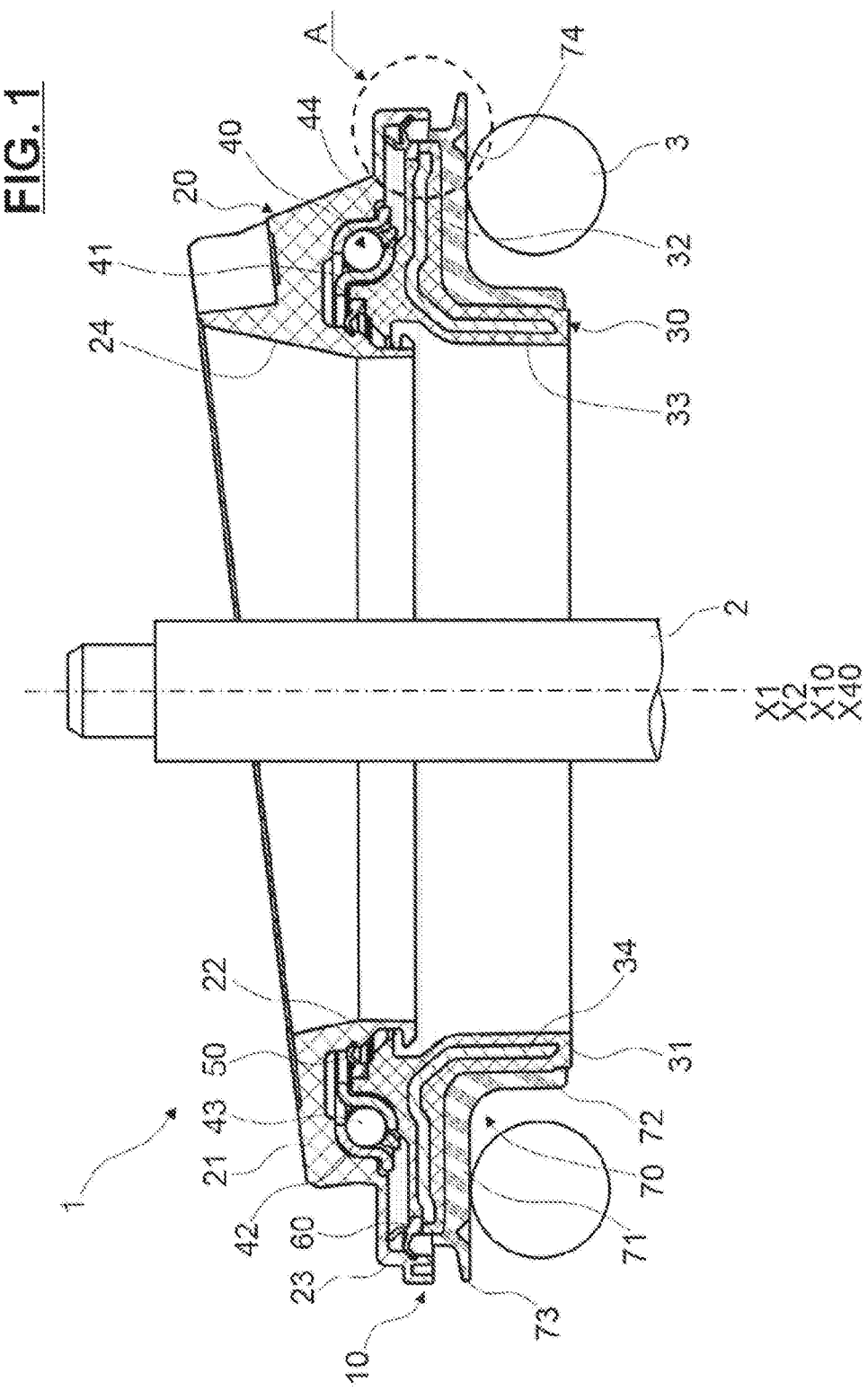
FIG. 1 is a sectional view of one or more embodiments of a suspension strut in accordance with this disclosure, having a suspension thrust bearing unit and a damper rod and a suspension spring.

A suspension strut 1, partially shown in FIG. 1, is incorporated into a motor-vehicle suspension system. The suspension strut 1 supports a vehicle axle and wheel which are not shown for the purposes of simplification. The suspension strut 1 extends along a main axis X1, placed in substantially vertical direction when the wheel of the vehicle rests on flat ground. The suspension strut 1 comprises a damper piston including a piston body and a damper rod 2 of axis X2, a coil suspension spring 3 and a suspension thrust bearing device 10. The rod 2 and the spring 3 are partially shown in FIG. 1, while the piston body is not shown for the purposes of simplification.

The suspension thrust bearing device 10 with main axis X10 is mounted between the spring 3 and a support block (not shown) connected to the chassis of a motor vehicle. The axis X2 and X10 coincide with the main axis X1 when the suspension system of the vehicle is at rest, as illustrated in FIG. 1.

Hereinafter, the adjectives "axial" and "radial" are defined relative to the main axis X10 of the annular thrust bearing device 10.

The suspension thrust bearing device 10 comprises an upper cap 20, a lower cap 30 and a single rolling bearing 40. In this embodiment, these three components 20, 30 and 40 are of globally circular shape about a main axis X40 coinciding with the main axis X10 when the suspension system of the vehicle is at rest.

The upper cap 20 consists in a one-piece part made from plastic synthetic material, for example from polyamide, optionally reinforced with glass fibers. The upper cap 20 has a radially-extending flange 21, an inner axially-extending hub 22 of relatively small diameter and extending towards the lower side of the suspension thrust bearing device 10, and an outer axially-extending skirt 23 of relatively large diameter and extending towards the lower side of the suspension thrust bearing device 10. The inner hub 22 defines an inner bore 24 for the suspension thrust bearing device 10 wherein the damper rod 2 is mounted.

The upper cap 20 is dedicated to be fixed to a support block of the automotive vehicle chassis.

The rolling bearing 40 comprises a pressed sheet metal inner race 41, an outer race 42 also of pressed sheet metal, a row of rolling elements 43, here balls, and a cage 44 for maintaining a regular circumferential spacing between the rolling elements 43. The rolling elements 43 are disposed in a rolling chamber defined between raceways formed by toroidal portions of the inner race 41 and outer race 42.

As an alternative not shown, no rolling elements need to be used but rather the inner and outer races may directly contact each other, with a suitable low friction material, coating, or lubricant being used.

The rolling bearing 40 is integrally radially located between the inner hub 22 and the outer skirt 23 of the upper cap 20. The inner race 41 is fitted within a toroidal inner portion of the lower cap 30. The inner race 41 and the lower cap 30 form a lower annular bearing member. The outer race 42 is fitted onto a toroidal outer portion provided on the lower side of flange 21 of the upper cap 20. The outer race 42 and the upper cap 20 form an upper annular bearing member. The upper and lower annular bearing members are in relative rotation with respect to the axis X40.

The lower cap 30 comprises an axially-extending hub 31 defining an inner bore 33 wherein the rod 2 axially extends. The lower cap 30 further comprises a radial flange 32 that radially outwardly extends from said hub 31. The toroidal outer portion supporting the inner race 41 of the rolling bearing 40 is provided on an upper surface of said radial flange 32.

The lower cap 30 comprises a stiffening insert 34 extending along the hub 31 and the flange 32 so as to support the load and the shocks exerted by the spring 3. The stiffening insert may be in metal or in a rigid plastic. As an alternative not shown, the upper cap 20 may also comprise a stiffening insert.

Inner sealing means 50 are provided between an inner periphery of the radial flange 32 of the lower cap 30 and the inner hub 22 of the upper cap 20. Outer sealing means 60 are provided between an outer periphery of the radial flange 32 of the lower cap 30 and the outer skirt 23 of the upper cap 20.

The lower cap 30 is further provided with a damping element 70 made from a resilient material so as to enable vibrations to be filtered.

The damping element 70 comprises a radial portion 71 and a tubular axial portion 72. The radial portion 71 is tightly fastened to the lower side of the radial flange 32 of the lower cap 30. The radial portion 71 comprises a lower radial side for receiving an end turn of the suspension spring 3 in bearing contact. Said radial portion 71 of the damping element 70 supports axial load and shocks from the suspension spring 3.

The tubular axial portion 72 axially extends from the radial portion 71 towards the lower side of the suspension thrust bearing device 10. Said tubular axial portion 72 is tightly fastened to an outer cylindrical surface of the hub 31 of the lower cap 30. Said tubular axial portion 72 of the damping element 70 supports radial load and shocks from the suspension spring 3.

The tubular axial portion 72 and radial portion 71 of the damping element 70 are connected together so as to cover the exterior surface of the axial hub 31 and the radial flange 32 of the lower cap 30.

The damping element 70 is made from a resilient material, such as rubber thermoplastic elastomer (TPE), in particular thermoplastic polyurethane (TPU), melt processable elastomer (MPE) or elastomer cellular foam.

The damping element 70 is advantageously overmoulded onto the lower cap 30. Alternatively, the damping element 70 is fixed to the lower cap 30 by any suitable fixing means, such as glue.

The damping element 70 further comprises a deflecting flange 73 to prevent any ingress of water and pollutant inside the device 10, and more particularly the bearing 40. The deflecting flange 73 extends the radial portion 71 radially outwards, starting from a large diameter edge. The deflecting flange 73 extends radially outwards beyond the large diameter edge of radial flange 32 of lower cap 30. Advantageously, the deflecting flange 73 extends radially outwards at least at the same diameter as the outer skirt 23 of outer cap 20.

In one or more embodiments, the damping element 70 is further provided with an annular groove 74 open axially towards the suspension spring 3. More precisely, the lower side of the radial portion 71 extended by the deflecting flange 73 is provided with the said annular groove 74.

Said annular groove 74 radially defines a spring support surface 75 on inner side, and the said deflecting flange 73 on outer side. In other words, the annular groove 74 radially disconnects the deflecting flange 73 from the surface 75 against which the suspension spring 3 exerts an axial load. These two functions ensured by the damping element 70 are then distinct from each other.

In accordance with this disclosure, the axial load of suspension spring 3 onto the damping element 70 induces axial and radial deformations of said element 70, and more particularly of the radial portion 71 which supports directly the said spring 3. The deflecting flange 73 is not affected by the deformation of radial portion 71, the flange 73 and the portion 71 being radially and circumferentially separated by the annular groove 74. It prevents any contact of deflecting flange 73 with the upper cup 20. The torque of device 10 is then under control. The deflecting flange 73 and the upper cup 20 are of increased service life without any worn due to undesired contacts. Extra noise is also prevented.

Figure 2:
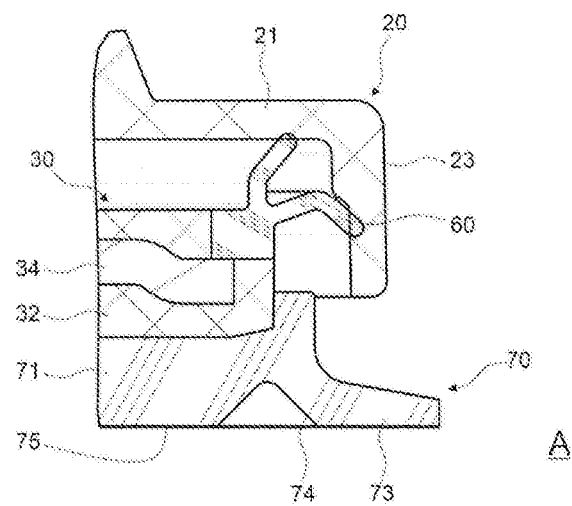
FIG. 2 is a detailed sectional view of one or more embodiments of a suspension thrust bearing device in accordance with this disclosure.
Figure 3:
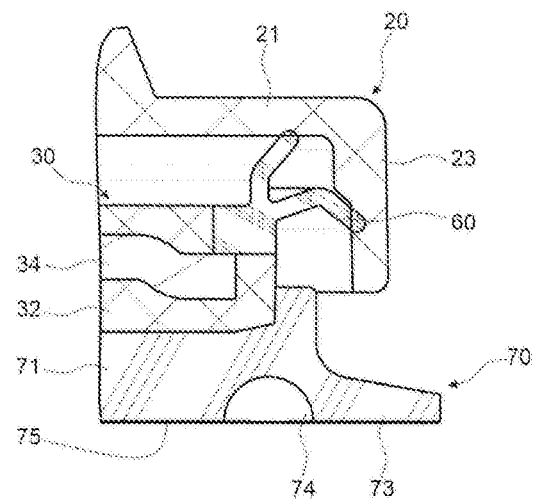
FIG. 3 is a detailed sectional view of one or more embodiments of a suspension thrust bearing device in accordance with this disclosure.
Figure 4:
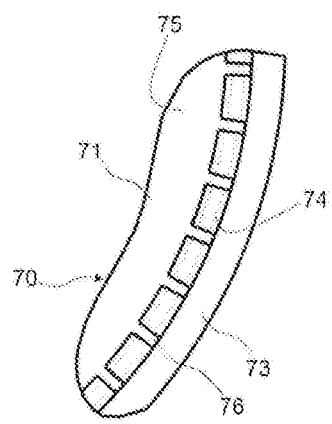
FIG. 4 is a detailed sectional view of one or more embodiments of a suspension thrust bearing device in accordance with this disclosure.

In the embodiment illustrated in FIGS. 1 and 2, the annular groove 74 is of conical shape. Alternatively, the annular groove 74 may be of rounded shape as illustrated in FIG. 3, or of any other suitable shape, e.g., a squared shape, a frustoconical shape.

Advantageously, the annular groove 74 comprises a plurality of stiffening ribs 76. The deflecting flange 74 is still disconnected from the radial portion 71 and then not affected by radial portion deformations, but the damping element design is stiffen by the said ribs. Advantageously, ribs 76 are circumferentially equally spaced within said groove 74.

In accordance with this disclosure, various embodiments overcome drawbacks in the art identified herein resulting in an enhanced suspension thrust bearing device. It is desirable to provide a suspension thrust bearing device which is relatively inexpensive, has a good operational reliability, and has an increased service life.

To this end, exemplary embodiments described herein are interrelated with a suspension thrust bearing device for use with a suspension spring in an automotive suspension strut of a vehicle. An interrelated exemplary suspension thrust bearing device comprises a bearing having upper and lower annular bearing members in relative rotation. Such a suspension thrust bearing device further comprises a damping element made of resilient material and interposed between the lower annular bearing member and a suspension spring. An exemplary damping element comprises at least one deflecting flange that outwardly and substantially radially extends for reducing any ingress of water and other pollutants between the upper and lower annular bearing members.

In an interrelated embodiment, a damping element is provided with an annular groove open axially towards a suspension spring; said annular groove radially defines a spring support surface on inner side, and a deflecting flange on outer side.

In an interrelated embodiment, a suspension thrust bearing device may incorporate one or several of the following features:

In an interrelated embodiment, a suspension thrust bearing device comprises a bearing with a first ring fixed to an upper cap, so as to form an upper annular bearing member of a suspension thrust bearing, and a second ring fixed to a lower cap, so as to form a lower annular bearing member of a suspension thrust bearing.

In an interrelated embodiment, first and second rings are made from a stamped metal sheet.

In an interrelated embodiment, upper and lower caps are made from a rigid plastic material.

In an interrelated embodiment, upper and/or lower caps may comprise stiffening insert.

In an interrelated embodiment, a bearing is a rolling bearing, first and second rings defining an annular rolling chamber between them and at least one row of rolling elements are disposed within said rolling chamber.

In an interrelated embodiment, rolling elements are balls.

In an interrelated embodiment, an upper annular bearing member comprises a radially-extending flange having the upper bearing surface, and an axially-extending hub having a bore.

In an interrelated embodiment, a damping element is directly molded on the lower annular bearing member.

In an interrelated embodiment, a damping element comprises rubber thermoplastic elastomer (TPE), in particular thermoplastic polyurethane (TPU), melt processable elastomer (MPE) or elastomer cellular foam.

In an interrelated embodiment, an annular groove has a conical shape.

In an interrelated embodiment, an annular groove has a round shape.

In an interrelated embodiment, an annular groove comprises a plurality of stiffening ribs.

In an interrelated embodiment, ribs are circumferentially equally spaced within said groove.

In an interrelated embodiment, a motor vehicle suspension strut comprises a damper rod, a suspension spring, and a suspension thrust bearing device in accordance with this disclosure.

In an interrelated embodiment, a motor vehicle thrust bearing device is of a MacPherson type ("MacPherson Suspension Bearing Unit" or MSBU).

Representative, non-limiting examples of embodiments were described above in details with reference to the attached drawings. This detailed description is merely intended to teach a person of skill in the art further details for practicing preferred aspects of the present teachings and is not intended to limit the scope of this disclosure. Furthermore, each of the additional features and teachings disclosed above may be utilized separately or in conjunction with other features and teachings to provided improved cam follower roller device.

Moreover, various features of the above-described representative examples, as well as the various independent and dependant claims below, may be combined in ways that are not specifically and explicitly enumerated in order to provide additional useful embodiments of the present teachings.

The invention claimed is:

1. A suspension thrust bearing device for use with a suspension spring in a suspension strut comprising:
a bearing having an upper annular bearing member and a lower annular bearing member rotationally movable relative to the upper annular bearing member; and
a damping element made of resilient material and configured to be interposed between the lower annular bearing member and a suspension spring, the damping element comprising at least one deflecting flange that outwardly and substantially radially extends from an outer side of an annular groove that radially defines a spring support surface on an inner side of the annular groove.

2. The suspension thrust bearing device of claim 1, wherein the annular groove has a conical shape.

3. The suspension thrust bearing device of claim 1, wherein the annular groove has a round shape.

4. The suspension thrust bearing device of claim 1, further comprising an upper annular bearing member having a bearing with a first ring fixed to an upper cap, and a lower annular bearing member having a second ring fixed to a lower cap.

5. The suspension thrust bearing device of claim 4, wherein the annular groove has a conical shape.

6. The suspension thrust bearing device of claim 4, wherein the annular groove has a round shape.

7. The suspension thrust bearing device of claim 4, wherein the first and second rings define an annular rolling chamber, and further wherein the bearing is a rolling bearing having least one row of rolling elements disposed within the rolling chamber.

8. The suspension thrust bearing device of claim 7, wherein the annular groove has a conical shape.

9. The suspension thrust bearing device of claim 7, wherein the annular groove has a round shape.

10. The suspension thrust bearing device of claim 1, wherein the annular groove comprises a plurality of stiffening ribs.

11. The suspension thrust bearing device of claim 10, wherein the stiffening ribs are circumferentially equally spaced within said annular groove.

12. A motor vehicle suspension strut comprising a damper rod, a suspension spring, and a suspension thrust bearing device according to claim 1.

13. A suspension thrust bearing device for use with a suspension spring in a suspension strut comprising:
a bearing having an upper annular bearing member and a lower annular bearing member rotationally movable relative to the upper annular bearing member;
a damping element made of resilient material and configured to be interposed between the lower annular bearing member and a suspension spring, the damping element comprising at least one deflecting flange that outwardly and substantially radially extends from an outer side of an annular groove that radially defines a spring support surface on an inner side of the annular groove;
an upper annular bearing member having a bearing with a first ring fixed to an upper cap; and
a lower annular bearing member having a second ring fixed to a lower cap, the second ring and the first ring together defining a rolling chamber.

14. The suspension thrust bearing device of claim 13, wherein the annular groove has a conical shape.

15. The suspension thrust bearing device of claim 13, wherein the annular groove has a round shape.

16. The suspension thrust bearing device of claim 13, wherein the annular groove comprises a plurality of stiffening ribs.

17. The suspension thrust bearing device of claim 16, wherein the stiffening ribs are circumferentially equally spaced within said annular groove.

18. A motor vehicle suspension strut comprising a damper rod, a suspension spring, and a suspension thrust bearing device according to claim 17.

19. A motor vehicle suspension strut comprising:
a damper rod;
a suspension spring; and
a suspension thrust bearing device having:
- a bearing having an upper annular bearing member and a lower annular bearing member rotationally movable relative to the upper annular bearing member;
- a damping element made of resilient material and configured to be interposed between the lower annular bearing member and the suspension spring, the damping element comprising at least one deflecting flange that outwardly and substantially radially extends from an outer side of an annular groove that radially defines a spring support surface on an inner side of the annular groove for receiving the suspension spring;
- an upper annular bearing member having a bearing with a first ring fixed to an upper cap;
- a lower annular bearing member having a second ring fixed to a lower cap; and
- a rolling bearing having least one row of rolling elements disposed within a rolling chamber defined by the first ring and the second ring.

20. The motor vehicle suspension strut of claim 19, wherein the annular groove has either a conical shape, a round shape, or a square shape.

* * * * *